April 28, 1970   J. R. ZURBRICK   3,509,456

DIELECTRIC PROBE FOR LOW CONDUCTIVITY FILAMENTARY MATERIAL

Filed Jan. 15, 1968

INVENTOR.
JOHN R. ZURBRICK
BY
ATTORNEYS.

United States Patent Office 3,509,456
Patented Apr. 28, 1970

3,509,456
DIELECTRIC PROBE FOR LOW CONDUCTIVITY FILAMENTARY MATERIAL
John R. Zurbrick, Nashua, N.H., assignor to Avco Corporation, Wilmington, Del., a corporation of Delaware
Filed Jan. 15, 1968, Ser. No. 697,854
Int. Cl. G01r 27/26; H01g 7/00
U.S. Cl. 324—61                                6 Claims

ABSTRACT OF THE DISCLOSURE

The disclosure illustrates a dielectric probe for determining material properties of low conductivity filamentary material, such as elemental boron. First and second elongated plate elements are formed on the inner sides of a pair of oppositely placed parallel printed circuit boards. Grounded electrically conductive portions of the printed circuit board surround but are insulated from the probe elements on the inner sides of the boards. Grounded electrically conductive portions of the printed circuit cover the outer sides of the printed circuit boards. The printed circuit boards are rigidly maintained relative to one another by a support material such as a curable resin. A Teflon tape is folded between the circuit boards and has the crease positioned to allow filamentary material to be passed through the plate elements to determine the material effects on an electrostatic field generated between the plate elements.

---

The present invention relates to dielectric probes and more specifically to dielectric probes used in the determination of material properties.

Low conductivity filamentary materials, such as elemental boron, boron carbide, and silicon carbide in filamentary form, require a convenient nondestructive test to determine their material properties. One approach that has been tried is to obtain inductively coupled eddy current measurements by the use of currently available eddy current equipment. However, the above materials exhibit such high resistance to free electron flow that the power contained in the magnetic field of the probe coil for the equipment is converted to heat. When these effects are compensated for by the measuring device and with the equipment (usually a sensitive impedance bridge) the true material properties variations are generally below the sensitivity of the measuring equipment. In addition, other effects, such as probe misalignment or material surface roughness, tend to mask these relatively small signal variations due to material properties.

Another method for determining properties of these materials that may be used is to position a specimen of the material to be tested in an electrostatic field. In this way the electrostatic field interacts with the "dielectric" entities of the specimen to produce a change in the electrostatic field which is indicative of cross-sectional geometry, cracks, inclusions or other defects. One of the problems with the use of an electrostatic field to determine material properties of low conductivity filamentary materials is that the effect of the material on the electrostatic field is so small as to be almost completely masked by stray capacitance effects generated around the capacitance device used to produce the electrostatic field.

Accordingly, it is a prime object of the present invention to provide a highly effective, accurate and economical test apparatus for determining material property variations of low conductivity materials.

The above ends are achieved by providing a dielectric probe which comprises first and second plate elements parallel to and directly opposite one another. One of the plate elements is adapted to receive an electrical signal and the other plate element is adapted to generate an electrical signal in response to electrostatic fields generated between the plate elements. A grounded electrically conductive surface is provided around the edges of the plate elements and grounded electrically conductive planes are closely spaced from the outer facing sides of the plate elements. The dielectric constant in the space between the plate elements and their respective conductive plane is maintained substantially constant and the plate elements are rigidly maintained at a given distance from one another. A means is positioned between the plate elements for maintaining a material specimen in a given position relative to the plate elements so that the signal generated on the other plane element is substantially only dependent on material specimen effects on the electrostatic field between the parallel plane elements.

The above and other related objects and features of the present invention will be apparent from a reading of the description of the disclosure found in the accompanying drawing and novelty pointed out in the appended claims.

Figure 1:
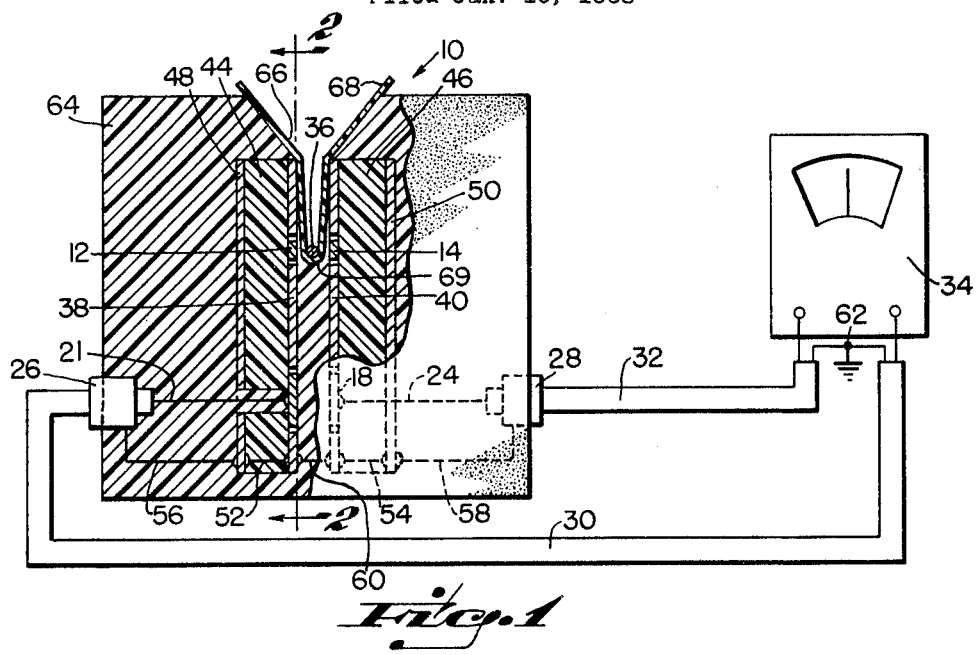
FIGURE 1 is a detailed section view of a dielectric probe embodying the present invention, together with an indicating device which provides a measure of the material properties of a specimen passed across the dielectric probe.
Figure 2:
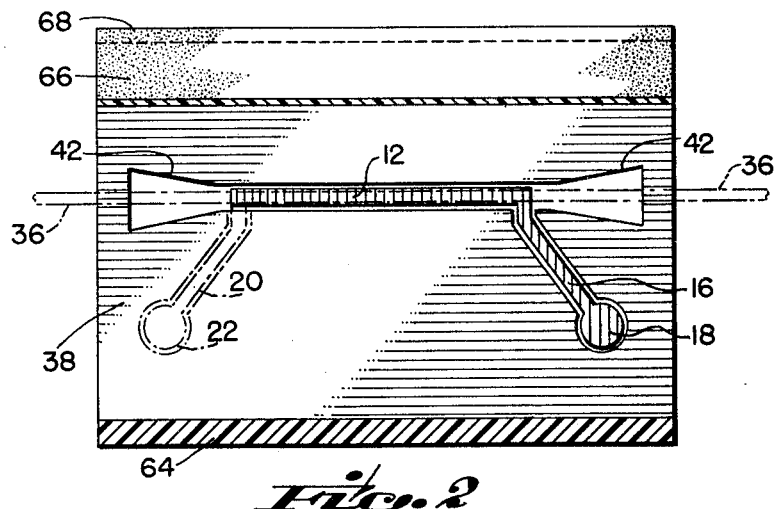
FIGURE 2 is a view taken on line 2—2 of FIGURE 1.

Reference is particularly had to FIGURE 1 which illustrates the dielectric probe, generally indicated by reference numeral 10. The dielectric probe comprises first and second generally longitudinal plate elements 12 and 14, respectively. The plate elements 12 and 14 are parallel to one another and spaced from one another a given distance, as later described in detail. The plate element 12 has a laterally extending branch portion 16 having an enlarged free end 18, as shown in FIGURE 2, to facilitate connection, as by soldering, of a lead 21. The plate element 14 also has a laterally extending branch portion 20 with an enlarged free end 22, as shown in phantom in FIGURE 2. An output lead 24 is connected as by soldering to the end 22 for the lateral portion of the plate element 14. The leads 21 and 24, respectively, connect to the center terminals of a pair of coaxial output connectors 26 and 28. A pair of coaxial cables 30 and 32, respectively, extend from the connectors 26 and 28 to input terminals of a capacitance indicating device 34.

The capacitance indicating device 34 may be one of a number of instruments adapted to measure the capacitance across the plate elements 12 and 14. For example, a Ballantine direct-reading capacitance meter Model 520, manufactured by Ballantine Laboratories, Inc., P.O. Box 97, Boonton, N.J. 07005, may be used with particular advantage.

Briefly, this meter provides an output indication which is a composite of the dielectric constant and the dissipation factor of the material between the probe elements 12 and 14. In cases where it is desirable to provide a separate indication of the dielectric constant and the dissipation factor, the General Radio automatic capacitance bridge assembly type 1680–A, manufactured by the General Radio Company, 22 Baker St., West Concord, Mass., is particularly suitable.

In accordance with the present invention, the dielectric probe 10 has a particular construction, described below, which enables it to be used to detect accurately material properties variation of a low conductivity material, such as elemental boron, herein illustrated in a filamentary form 36.

Each of the plate elements 12 and 14 is surrounded by an electrically conductive surface 38 and 40, respectively. As shown in FIGURE 2, the electrially conductive surface 38 is spaced from the edges of the plate element 12 and its lateral branch portion 16 so as to be insulated therefrom. It should also be noted that the electrically conductive surface 38 has generally triangular openings 42 extending from either end of the elongated plate element 12. The electrically conductive sheet 40 is similarly insulated from the plate element 14 and its laterally extending branch portion 20. The sheet 40 has generally triangular openings similar to those of sheet 38 but not shown for simplification.

The plate element 12, along with its lateral branch portion 16 and the electrically conductive surface 38, are mounted on a sheet of relatively stable dielectric material 44. The plate element 14, its branch portion 20 and the surrounding electrically conductive sheet 40, are mounted to a second sheet of relatively stable dielectric material 46. A pair of electrically conductive sheets 48 and 50 are respectively secured to the outer facing sides of the dielectric sheets 44 and 46.

The electrically conductive sheets 48 and 38 are connected by a wire 52 extending through the dielectric material 44. The electrically conductive sheets 40 and 50 are similarly connected by a wire 54 which extends through the dielectric material 46. Wires 56, 58 and 60 interconnect the electrically conductive sheets and connect them to the outer terminals of the coaxial connectors 26 and 28. The outer terminals of the connectors 26 and 28 through the cables 30 and 32 are connected to a ground terminal 62 on the indicating instrument 34 so that the electrically conductive sheet 48, 38, 40 and 50 are all maintained at ground potential.

The plate elements 12 and 14 are maintained in rigid spaced relationship by a surrounding base material 64 comprised of dielectric material to form a rigid mounting therefor. The filamentary specimen 36 is maintained in a given position relative to the plate elements 12 and 14 by a channel-shaped element 66, herein illustrated as folded Teflon tape, which is flared out at its outer edges 68 to facilitate placement of the filamentary specimen 36 between the plates 12 and 14 at the crease or bottom wall 69 of the element.

Figure 3:
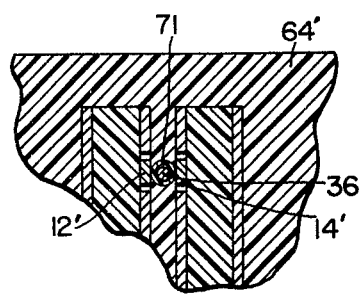
FIGURE 3 is a fragmentary section view of a dielectric probe embodying an alternative feature of the present invention.

An alternative method of maintaining the filamentary specimen 36 in a given position is shown in FIGURE 3. Plate elements 12' and 14' have therebetween a tubular nonconductive element 71 extending longitudinally between the plate elements 12' and 14' and beyond the end of the dielectric housing material 64'. The ends of the tube 71 are belled to enable ready insertion of the filamentary material 36.

The plate elements 12 and 14 and the surrounding electrically conductive ground potential sheets may be conveniently formed by using printed circuit board techniques. If this method of construction is selected, the dielectric sheets 44 and 46 form the base for a pair of printed circuit boards and the plate elements and surrounding electrically conductive sheets are formed on the bases by well-known methods, such as photo etching, to enable economical and rapid construction.

To assemble a dielectric probe 10 which utilizes printed circuit boards, the electrical connections between the electrically conductive portions are first established and the Teflon tape 66 is folded between the inner faces of the printed circuit boards so that its bottom wall or crease is in line with the plate elements 12 and 14. Shim stock is then placed between the walls of the Teflon tape to provide a separation of the printed circuit boards at a predetermined distance which is sufficient to accommodate the diameter of the filamentary material 36. The printed circuit boards, shim stocks and Teflon tape are then sandwiched together by a suitable clamp and the entire assembly surrounded by the dielectric mounting material 64 which can be a curable resin material such as epoxy resin. Once the resin is cured, the shim stocks may be removed and the electrical connections established to the output connectors 26 and 28 to enable operation of the dielectric probe in testing the filamentary material 36.

In operation, the filamentary specimen 36 is passed along the bottom wall or crease of the Teflon tape 66, during which time an electrical signal is generated on plate element 12 and the received electrical signal on plate element 14 indicated on the meter 34. As stated previously, the effect of the low conductivity filamentary material 36 upon the electrostatic field between the plate elements is extremely minute and necessitates a highly accurate indication of the electrostatic field between the plate elements 12 and 14. This is accomplished by providing the ground potential surfaces behind the plate elements and surrounding them. As a result, essentially all stray electrostatic fields are shielded out so that the primary electrostatic field is generated between the parallel disposed plate elements 12 and 14. Thus, a high degree of accuracy is realized which enables a realistic measurement of the variation in material properties of the filamentary material 36 along its length.

It should be noted that the plate elements 12 and 14 are elongated and the filamentary material 36 is positioned generally parallel to their longitudinal axes and directly between them. This enables the electrostatic field through which the filamentary material 36 passes to be maximized, thus magnifying the effects of the material on the electrostatic field. To further measure a maximum concentration of the electrostatic field, the width of the plate elements 12 and 14 is at least as large as the maximum anticipated diameter of the filamentary material 36.

The laterally extending branch portions 16 and 20 of the respective plate elements 12 and 14 facilitate electrical connections of the leads 21 and 24 which become increasingly important when the plate elements and branch portions are relatively small, such as several thousandths of an inch, for use with very small diameter material 36. In order to prevent an additional electrostatic field from being built up between the branch portions 20 and 16 of the opposing plate elements, the branch portions 20 and 16 are staggered, as shown in FIGURE 2, so that they do not lie directly opposite one another. It should also be noted that the triangular openings in the sheets 38 and 40 at the end of the plate elements prevent the low conductivity filamentary material from providing a path for the electrostatic field directly into the portion of the grounded conductive sheets 38 or 40 which is in line with the path of the filamentary material 36.

The dielectric probe described above enables a highly accurate and simplified determination of material properties of low conductivity material in a filamentary form. While the dielectric probe has been described in connection with this type of material in filamentary form, it should be apparent to those skilled in the art that it may be used with equal advantage and utility to other types of material in other physical forms.

Having thus described the invention, what is claimed as novel and desired to be secured by Letters Patent of the United States is:

1. A dielectric probe for determining material properties of elongated filamentary specimens, said probe comprising:

first and second plate elements parallel to and each having a first side spaced directly opposite the first side of the other plate element, one of said plate elements being adapted to receive an electrical signal and the other of said plate elements being adapted to generate an electrical signal in response to electrostatic field generated between said plate elements;

means for providing a conductive surface at ground potential around the edges of each of said plate elements;

means for providing ground potential sheets closely spaced from the second sides of said plate elements;

means for maintaining the dielectric constant in the space between said plate elements and said ground potential sheets substantially constant;

means for rigidly maintaining said plate elements at a given distance from one another; and electrically nonconductive material positioned between said plate elements and forming a passageway through which said specimen is passed for maintaining said specimen in a given position relative to said plate elements;

said elongated plate elements having a relatively thin width and further comprising first and second laterally extending branch portions having enlarged ends for exterior electrical connection of said plate elements, said first and second lateral branch portions being staggered with respect to one another to prevent the generation of electrostatic fields between the branch portions of the oppositely positioned plate elements;

whereby the signal generated is substantially only dependent upon material specimen effects on the electrostatic field between said parallel plate elements.

2. A dielectric probe as in claim 1 wherein:

said means for maintaining the dielectric constant between said first and second plate elements and the conductive sheets therefor comprises first and second sheets of relatively stable dielectric material forming a printed circuit board base for said first and second plate elements;

said first and second plate elements comprises electrically conductive printed circuit portions formed on one side of said circuit board;

said means for providing a conductive surface at ground potential comprises an electrically conductive printed portion on said one side surrounding said plate elements and insulated therefrom;

said means for providing a ground potential sheets comprises an electrically conductive sheet formed on the opposite side of said circuit boards, said sheet extending at least as far as the outer edges of said plate elements.

3. A dielectric probe as in claim 2 wherein said position-maintaining means comprises:

a dielectric tubular element extending between said plate elements and beyond their ends, said tubular element having belled ends for insertion of relatively thin filamentary material.

4. A dielectric probe as in claim 2 wherein:

said position-maintaining means has a generally channel-shaped passageway between said plate elements and having a flared-out open end into which said filamentary specimen is placed, said passageway having a bottom wall along which said filamentary specimen is traversed for determining the material properties thereof.

5. A dielectric probe as in claim 4 wherein:

said means for rigidly maintaining said plate elements in a given position is formed from a unitary curable resin surrounding said plate elements, said position-maintaining means comprises a folded plastic tape having the fold thereof positioned adjacent the plate elements and having the free ends extending beyond the ends of the printed circuit.

6. A dielectric probe as in claim 5 for use with means for indicating the capacitance across said plates for determining material properties, said dielectric probe further comprising:

first and second axial output connectors, each having an insulated center terminal and an outer grounded terminal;

means for respectively electrically connecting the enlarged laterally extending portions of said first and second plate elements to the center terminals of said first and second output connectors;

means for electrically connecting the surrounding electrically conductive portion on one side of said printed circuit board and the electrically conductive sheet on the opposite side thereof to the outer grounded terminal of said output connectors.

References Cited

UNITED STATES PATENTS

| 2,562,575 | 7/1951 | Raesler | 324—61 |
| 2,604,513 | 7/1952 | Parkinson et al. | 324—61 |
| 2,804,592 | 8/1957 | Biskeborn | 324—61 |
| 2,992,392 | 6/1961 | Haynes | 324—61 |
| 3,028,548 | 4/1962 | Breen | 324—61 |
| 3,185,924 | 5/1965 | Locher | 324—61 |
| 3,247,455 | 4/1966 | Benson | 324—61 |
| 3,284,706 | 11/1966 | Benson | 324—61 |
| 3,430,140 | 2/1969 | Preikschat | 324—61 |

FOREIGN PATENTS

| 121,163 | 3/1946 | Australia. |
| 1,359,960 | 12/1964 | France. |

EDWARD E. KUBASIEWICZ, Primary Examiner

U.S. Cl. X.R.

317—246